United States Patent [19]
Vanpoucke

[11] Patent Number: 5,262,939
[45] Date of Patent: Nov. 16, 1993

[54] SYSTEM FOR PROCESSING PARCEL SHIPPING

[75] Inventor: Jean-Francois Vanpoucke, Verrieres le Buisson, France

[73] Assignee: Alcatel Satmam, Bagneux, France

[21] Appl. No.: 725,119

[22] Filed: Jul. 3, 1991

[30] Foreign Application Priority Data

Jul. 3, 1990 [FR] France .................. 90 08395

[51] Int. Cl.⁵ .................. G06F 15/22; G06F 15/00
[52] U.S. Cl. .................. 364/401; 364/406; 364/408; 364/464.01; 235/379
[58] Field of Search ......... 364/401, 406, 408, 900, 364/464.01, 468, 464.02, 464.03; 235/379, 380; 360/60; 380/3-4, 25

[56] References Cited

U.S. PATENT DOCUMENTS

| | | | |
|---|---|---|---|
| 4,713,761 | 12/1987 | Sharpe et al. | 364/406 |
| 4,839,813 | 6/1989 | Hills et al. | 364/401 |
| 4,866,769 | 9/1989 | Karp | 380/4 |

FOREIGN PATENT DOCUMENTS

| | | |
|---|---|---|
| 0333043 | 9/1989 | European Pat. Off. |
| WO8801818 | 3/1988 | PCT Int'l Appl. |

Primary Examiner—Roy N. Envall, Jr.
Assistant Examiner—Frantzy Poinvil
Attorney, Agent, or Firm—Sughrue, Mion, Zinn, Macpeak & Seas

[57] ABSTRACT

A system for processing parcel shipping comprises a set of "file memories" (2) containing firstly the identities of carriers, of senders, of the services offered by each carrier, of the documents that should accompany each shipment, and of the access of each sender to the various carriers and their services, and secondly receiving characteristics relating to each shipment, a programmed control unit (3) coupled to the files to generate and control the storing of characteristics specific to each shipment, document printers (10-13) for generating the documents for each shipment, the printer including a postage meter (13). The system further includes scales (14), and being characterized in that it includes an electronic card (20) for insertion into the processor unit to supervise its connection with the postage meter (13) and the scales (14), and to monitor and lock the software of the system by intervening in data exchanges between the programmed control unit (3) and the set of memories (2).

4 Claims, 1 Drawing Sheet

SYSTEM FOR PROCESSING PARCEL SHIPPING

BACKGROUND OF THE INVENTION

The present invention relates to a system for processing parcel shipping. This system may be used for processing the shipping of parcels from different senders that are to be conveyed to different recipients by different carriers which may be public or private.

French patent No. 88 03277 filed Mar. 14, 1988 describes a system for processing parcel shipping enabling shipments received from various shippers to be conveyed to their respective recipients via various carriers on the basis of data defining a recipient and a carrier for each shipment, together with a specific one of that carrier's services which is to be used, the system being characterized in that it comprises:

first memories constituting, firstly a carrier file containing characteristics specific to the carriers usable by the system and relating to individual identification of the carriers themselves and to identification of the various services offered by each of them, together with the types of documents required for accompanying each shipment for each service, and secondly a sender file containing characteristics specific to the senders using the system and relating to individual identification of the senders themselves, and to identification of the carriers that each of the senders may use and the service of said carriers to which they have access;

a second memory constituting a shipment file;

input means for inputting data relating to each shipment;

print means for outputting documents; and a programmed control unit coupled to said files, to said input means and to said print means, and including shipment preprocessing means for inputting data and for verifying the input data from the carrier and sender files, shipment processing means attributing an individual reference to each shipment which, together with the data as input and verified defines the characteristics of the corresponding shipment, referred to as a "processed" shipment, and storing the characteristics of each processed shipment in a shipment record in the shipment file, and document printing control means for generating the documents identified in the carrier file on the basis of the shipment record in the shipment file corresponding to each shipment.

The system includes scales coupled to the programmed unit.

The print means include a postage meter and printers for printing documents other than payment stickers.

The first memories also include a destination country file containing characteristics specific to said countries and relating to their identification both with respect to tariff and with respect to the documents specific to services for said countries.

Such a system is an association or grouping of carriers to which users apply for shipping or receiving parcels.

Such a system requires frequent updating because of the changes that occur in the parameters used, and in particular: changes in postal tariffs; changes in the documents that accompany parcels; etc.

This updating is performed by the constructor of the system, and is an operation that requires investment because of the need to perform constant monitoring of the regulations and tariffs in force, the need to interpret them, and to materialize them in the form of updating floppy disks which are used in the system. A first object of the invention is to prevent a user of the system with a plurality of systems in operation being tempted to acquire a single updating floppy disk and to reproduce the updating floppy disk for use by other systems.

Another object of the invention is to provide a system capable of making use of any controlling programmed platform (e.g. a commercial PC) in association with any postage meter.

SUMMARY OF THE INVENTION

The present invention provides a system for processing parcel shipping enabling shipments received from various shippers to be conveyed to their respective recipients via various carriers on the basis of data defining a recipient and a carrier for each shipment, together with a specific one of that carrier's services which is to be used, the system comprising:

first memories constituting, firstly a carrier file containing characteristics specific to the carriers usable by the system and relating to individual identification of the carriers themselves and to identification of the various services offered by each of them, together with the types of documents required for accompanying each shipment for each service, and secondly a sender file containing characteristics specific to the senders using the system and relating to individual identification of the senders themselves, and to identification of the carriers that each of the senders may use and the services of said carriers to which they have access;

a second memory constituting a shipment file;

input means for inputting data relating to each shipment;

print means for outputting documents; and a programmed control unit coupled to said files, to said input means and to said print means, and including shipment preprocessing means for inputting data and for verifying the input data from the carrier and sender files, shipment processing means attributing an individual reference to each shipment which, together with the data as input and verified defines the characteristics of the corresponding shipment, referred to as a "processed" shipment, and storing the characteristics of each processed shipment in a shipment record in the shipment file, and document printing control means for generating the documents identified in the carrier file on the basis of the shipment record in the shipment file corresponding to each shipment, said system including scales coupled to said programmed unit, said print means including a postage meter and printers for printing documents other than payment stickers, the first memories also including a destination country file containing characteristics specific to said countries and relating to their identification both with respect to tariff and with respect to the documents specific to services for said countries, the system being characterized in that it includes an electronic card for insertion into the processor unit and controlling the connection with said postage meter and said scales, and monitoring and locking the software of the system by intervening in data interchanges between the programmed control unit and the set of memories.

The card is connected firstly via a bus to the postage meter and to the scales, and secondly via a bus to the programmed control unit.

The card includes a microcontroller associated with a read only memory containing an initialization program, a read/write memory containing an application program and, and a special program containing lists of authorized tariff calculations and of documents to be printed, thereby constituting the configuration of the system.

The special program contains a system number (N1), a secret number (N2), an encrypting table (T1) common to all systems, and an encrypting table (T2) specific to the card, with updating floppy disks received by the user having data that is encrypted using the combination (N1, T1), which data can be used in the system program only when encrypted by the combination (N2, T2).

The application program in the card is erased when data interchange with the system program exceeds a predetermined duration.

The invention will be well understood from the following description of a particular embodiment of the invention given with reference to the accompanying drawing, in which:

DETAILED DESCRIPTION OF THE PREFERRED EMBODIMENT

Figure 1:
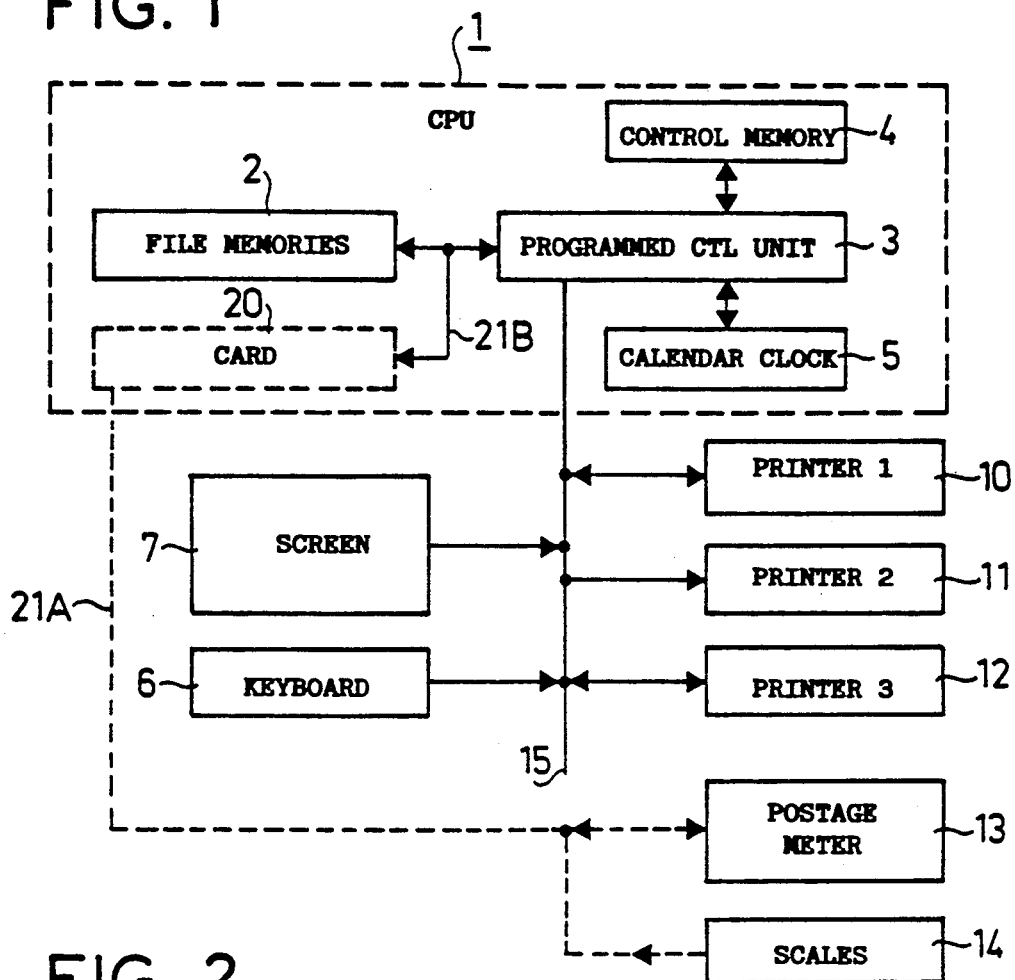
FIG. 1 is a block diagram of the shipping processing system of the invention.

In FIG. 1, solid lines show parts of the system described in the above-mentioned patent, whereas dashed lines show additional parts provided by the present invention.

In FIG. 1, reference 1 designates a central processor unit comprising a set of "file" memories 2, a programmed control unit 3, a memory 4 for functions which are specific to control purposes, and a calender clock 5. The set of memories 2, the memory 4, and the calender clock are coupled to the programmed control unit 3 via internal buses.

The system further includes a keyboard 6 and a screen 7 coupled to the central processor unit 1 for the purpose of dialogue with an operator; document-generating means, e.g. printers, there being three such means referenced 10, 11, and 12 in this case, each being dedicated to printing a specific type of document. The printers are connected to the keyboard and to the screen and also to the central processor unit by buses, each of which is connected to a common access bus 15.

Finally, the system has a postage meter of "franking machine" 13 and scales 14.

All of the above-mentioned items are described in the above-mentioned patent to which the reader may refer for further details.

According to the present invention, the system includes a card referred to as the "parcel system card" 20 which is preferably inserted in the central processor unit.

A first function of the card 20 is to control the connection with the postage meter and the scales 14. To do this, the card 20 is directly connected via a bus 21A to the postage meter 13 and to the scales 14.

Another function of the card 20 is to provide monitoring and locking for the system by engaging in data interchanges between the programmed control unit 3 and the set of memories 2. To this end, the card 20 is connected via a bus 21B to the programmed control unit 3.

Figure 2:
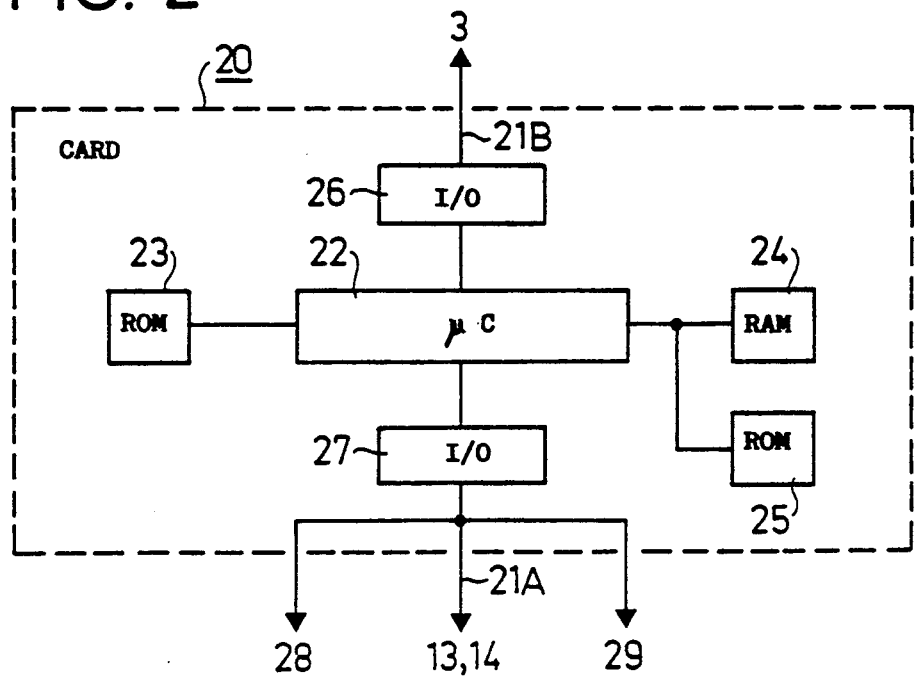
FIG. 2 is a block diagram showing the configuration of the parcel system card fitted to the system of the invention.

The structure and the operation of the card 20 appear in the light of the explanation given below with reference to FIG. 2 which is a block diagram of the card.

The card 20 is organized around a microcontroller 22 associated with a read only memory (ROM) 23 and a read/write memory (RAM) 24.

The ROM 23 contains an initialization program which enables the software of the microcontroller 22 to be loaded with the application program contained in the RAM 24.

The application program of the card is loaded when the system programs using the card are launched; the application program ceases to run on leaving said programs.

The application program in the card is erased in the following circumstance on instruction from the system software;

in the event of a power failure or of the card being withdrawn from the central unit; and when the interchange of data with the system program does not take place within a predetermined duration.

The card 20 further includes a special program 25 which is connected to the microcontroller and which contains memories with lists of authorized tariff calculations and of documents to be printed, thereby constituting the configuration of the system. These lists are established during system configuration and they are written into memories in the card.

The special program 25 further contains:

a system number N1 specific to the system;

a secret number N2, specific to the card;

an encrypting table T1 which is common to all systems; and an encrypting table T2 which is specific to the card.

The floppy disks containing updates or changes in tariffs as received by the user of the system have the data thereon encrypted using the combination N1, T1. Once transferred into the system, this data can be made use of by the program thereof only if encrypted by the combination N2, T2.

By having the card 20 present in the central processor unit, any risk of fraud by the users of the system is avoided since the updating floppy disks can be used by that system only.

In addition, any attempt to benefit from services or tariffs to which the user is not entitled will fail since the special component contains limiting lists of tariffs and corresponding documents.

Finally, any attempt at decrypting the codes or the encrypting used will be defeated since such attempts will necessarily require a length of time that exceeds the time normally required for system use, and that will cause the application program to be erased from the card.

The card contains interfaces 26 and 27 for connection respectively with the programmed control unit 3 and with the postage meter 13 and the scales 14.

The card may include additional outputs, such as 28 and 29 for connection to additional peripherals.

What is claimed is:

1. A system for processing parcel shipping enabling shipments received from various shippers to be conveyed to their respective recipients via various carriers on the basis of data defining a recipient and a carrier for each shipment, together with a specific one of that carrier's services which is to be used, the system comprising:

first memories constituting, firstly a carrier file containing characteristics specific to the carriers usable by the system and relating to individual identification of the carriers themselves and to identification of the various services offered by each of them, together with the types of documents required for accompanying each shipment for each service, and secondly a sender file containing characteristics specific to the senders using the system and relating to individual identification of the senders themselves, and to identification of the carriers that each of the senders may use and the services of said carriers to which they have access; the first memories further including a destination country file containing characteristics specific to countries contained in said country file and relating to their identification both with respect to tariffs and with respect to the documents specific to services for said countries;

a second memory constituting a shipment file;

input means for inputting data relating to each shipment;

print means for outputting documents;

a programmed control unit coupled to said files, to said input means and to said print means, and including:

shipment preprocessing means for verifying the input data from the carrier and sender files;

shipment processing means for attributing an individual reference to each shipment which, together with the data as input and verified, defines the characteristics of the corresponding shipment, referred to as a "processed" shipment, and storing the characteristics of each processed shipment in a shipment record in the shipment file; and document printing control means for generating the documents identified in the carrier file on the basis of the shipment record in the shipment file corresponding to each shipment;

said system including scales coupled to said programmed control unit;

said print means including a postage meter and printers for printing said documents stickers; and the system further it includes an electronic card (20) for insertion into the programmed control unit and which contains a system number N1, a secret number N2, an encrypting table T1 common to all systems, and an encrypting table T2 specific to the electronic card, such that the data contained in the first memories and encrypted using the combination N1, T1, are available for use in the system only when encrypted by the combination N2, T2.

2. The system according to claim 1 characterized in that said electronic card (20) is connected firstly via a bus (21A) to the postage meter (17) and to the scales (14), and secondly via another bus (21B) to the programmed control unit.

3. The system according to claim 2, characterized in that said electronic card (20) includes a microcontroller (22) associated with a read only memory containing an initialization program, a read/write memory (24) containing an application program and, and a special program (25) containing lists of authorized tariff calculations and of documents to be printed, thereby constituting the configuration of the system.

4. The system according to any one of claims 1 to 3, characterized in that the application program in the card electronic is erased when data interchange with the system program exceeds a predetermined duration.

* * * * *